(12) United States Patent
Takagi

(10) Patent No.: US 11,280,606 B2
(45) Date of Patent: Mar. 22, 2022

(54) MOVING OBJECT AND RANGING APPARATUS CAPABLE OF ACQUIRING IMAGE AND HIGH-ACCURATELY MEASURING DISTANCE

(71) Applicant: CANON KABUSHIKI KAISHA, Tokyo (JP)

(72) Inventor: Akinari Takagi, Yokosuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 828 days.

(21) Appl. No.: 16/074,278

(22) PCT Filed: Feb. 28, 2017

(86) PCT No.: PCT/JP2017/008640
§ 371 (c)(1),
(2) Date: Jul. 31, 2018

(87) PCT Pub. No.: WO2017/150736
PCT Pub. Date: Sep. 8, 2017

(65) Prior Publication Data
US 2021/0190485 A1    Jun. 24, 2021

(30) Foreign Application Priority Data

Mar. 4, 2016 (JP) .............................. JP2016-042699
Feb. 23, 2017 (JP) .............................. JP2017-032417

(51) Int. Cl.
*G01C 3/08* (2006.01)
*G02B 7/34* (2021.01)
(Continued)

(52) U.S. Cl.
CPC .............. *G01C 3/085* (2013.01); *G02B 7/30* (2013.01); *G02B 7/34* (2013.01)

(58) Field of Classification Search
CPC ............. G01C 3/085; G02B 7/34; G02B 7/30
(Continued)

(56) References Cited

U.S. PATENT DOCUMENTS 6,483,429 B1 * 11/2002 Yasui .................... B60Q 9/005
340/435
8,098,322 B2    1/2012 Katsuda
(Continued)

FOREIGN PATENT DOCUMENTS

CN    101540848 A    9/2009
CN    103576133 A    2/2014
(Continued)

OTHER PUBLICATIONS

International Search Report issued in Intl. Appln. No. PCT/JP2017/008640 dated Jun. 28, 2017.
(Continued)

*Primary Examiner* — Daniel L Murphy
(74) *Attorney, Agent, or Firm* — Rossi, Kimms & McDowell LLP

(57) ABSTRACT

Provided is a ranging apparatus capable of acquiring an image and high-accurately measuring a distance. The ranging apparatus includes a camera 10 which includes an optical system 53 and an image pickup device 12 having a plurality of pixels arranged therein, an image analysis section 13, and a distance information acquisition section 14, the optical system 53 includes an aperture 51 disposed between two lenses 11*a* and 11*b*, the aperture 51 includes two aperture holes 52 corresponding to two ranging pupils 31 and 32, and the pixels include two image pickup pixels 12*b* corresponding to two aperture holes 52.

16 Claims, 14 Drawing Sheets

(51) Int. Cl.
*G02B 7/30* (2021.01)
*G01S 11/12* (2006.01)

(58) Field of Classification Search
USPC ................................................ 356/3, 3.01
See application file for complete search history.

(56) References Cited

U.S. PATENT DOCUMENTS

| | | |
|---|---|---|
| 8,675,290 B2 | 3/2014 | Rohaly |
| 9,348,019 B2 | 5/2016 | Wang |
| 9,456,119 B2 | 9/2016 | Hamano |
| 9,531,944 B2 | 12/2016 | Hamano |
| 9,534,892 B2 | 1/2017 | Goering |
| 9,753,135 B2 | 9/2017 | Bosch |
| 2009/0225217 A1 | 9/2009 | Katsuda et al. |
| 2015/0092988 A1 | 4/2015 | Mitoma et al. |
| 2015/0281556 A1 | 10/2015 | Hamano |

FOREIGN PATENT DOCUMENTS

| | | |
|---|---|---|
| CN | 103839952 A | 6/2014 |
| CN | 104508425 A | 4/2015 |
| JP | 2001021792 A | 1/2001 |
| JP | 2009527007 A | 7/2009 |
| JP | 2009192605 A | 8/2009 |
| JP | 2012008370 A | 1/2012 |
| JP | 2013097280 A | 5/2013 |
| JP | 2013190622 A | 9/2013 |
| JP | 2015194706 A | 11/2015 |

OTHER PUBLICATIONS

Written Opinion issued in Intl. Appln. No. PCT/JP2017/008640 dated Jun. 28, 2017.
Office Action issued in Japanese Appln. No. 2017-032417 dated Mar. 30, 2021.
Office Action issued in Chinese Appln. No. 201780015269.9 dated Apr. 20, 2020. English translation provided.

* cited by examiner

BASE LINE LENGTH

MOVING OBJECT AND RANGING APPARATUS CAPABLE OF ACQUIRING IMAGE AND HIGH-ACCURATELY MEASURING DISTANCE

TECHNICAL FIELD

The present invention relates to a moving object and a ranging apparatus capable of acquiring an image and high-accurately measuring a distance and particularly to a moving object and a ranging apparatus measuring a distance by an imaging plane phase difference method.

BACKGROUND ART

In order to assist a movement of a moving object such as a vehicle, a drone, and a robot, there is a need to measure a distance between the moving object and an object in the periphery of the moving object, for example, an obstacle. Particularly, in order to perform a movement assistance involving with an operation of avoiding a collision or following other objects, a recognition process using an image of the obstacle is also needed. Accordingly, the moving object is usually provided with a camera as an image pickup apparatus to measure a distance to the obstacle. As a method of acquiring the distance to the obstacle (the object) as well as an image of the obstacle used for the recognition process in a technical field of a camera, an imaging plane phase difference method is known (see Patent Literatures 1 and 2). In the imaging plane phase difference method, a parallax of a pair of images caused by two light fluxes having passed respectively through two different areas (partial pupils) existing in an exit pupil of an optical system of the camera is obtained and the distance to the object is measured using a principle of triangulation from the obtained parallax. In the camera using the imaging plane phase difference method, for example, each pixel of an image pickup device includes two photoelectric conversion parts (photodiodes). In the imaging plane phase difference method, the parallax of the pair of images is obtained from an electric signal obtained through the conversion of an optical image formed by light fluxes incident to two photoelectric conversion parts (hereinafter, referred to as an "image signal") and the image signals obtained from the two photoelectric conversion parts are added to each other to acquire an object image.

Incidentally, a high-quality image is needed in a so-called still camera or video camera. Since the two light fluxes passing respectively through two partial pupils are incident respectively to two corresponding photoelectric conversion parts of the pixel, it is necessary to increase the sizes of two partial pupils of the exit pupil to make an image formed through adding the image signals obtained from two photoelectric conversion parts be equal to an image formed by the light fluxes having passed through the entire exit pupil.

CITATION LIST

Patent Literature

PTL 1: Japanese Laid-Open Patent Publication (Kokai) No. 2013-190622

PTL 2: Japanese Laid-Open Patent Publication (Kokai) No. 2001-21792

SUMMARY OF INVENTION

Technical Problem

However, as shown in FIG. 16, when two partial pupils 160 and 161 are increased in size, a base line length which is a center-to-center distance between two partial pupils 160 and 161 is shortened and thus a parallax of a pair of images obtained from image signals 162 and 163 obtained from two photoelectric conversion parts decreases. As a result, there is concern that the accuracy of a measured distance may be deteriorated in the imaging plane phase difference method that measures the distance to the object using the principle of triangulation from the parallax.

An object of the present invention is to provide a ranging apparatus capable of acquiring an image and high-accurately measuring a distance.

Solution to Problem

In order to attain the above-described object, according to the present invention, provided is a ranging apparatus comprising an image pickup part configured to include an optical system having an aperture and an image pickup device having a plurality of pixels arranged therein and a distance information acquisition part configured to acquire object distance information on the basis of an output signal of the image pickup device, wherein the aperture is provided with first and second aperture holes, and the pixels include first and second pixels having different incident angle sensitivity characteristics.

Advantageous Effects of Invention

According to the present invention, it is possible to provide a ranging apparatus capable of acquiring an image and high-accurately measuring a distance.

DESCRIPTION OF EMBODIMENTS

Hereinafter, embodiments of the present invention will be described with reference to the drawings.

Further features of the present invention will become apparent from the following description of exemplary embodiments (with reference to the attached drawings).

Figure 1:
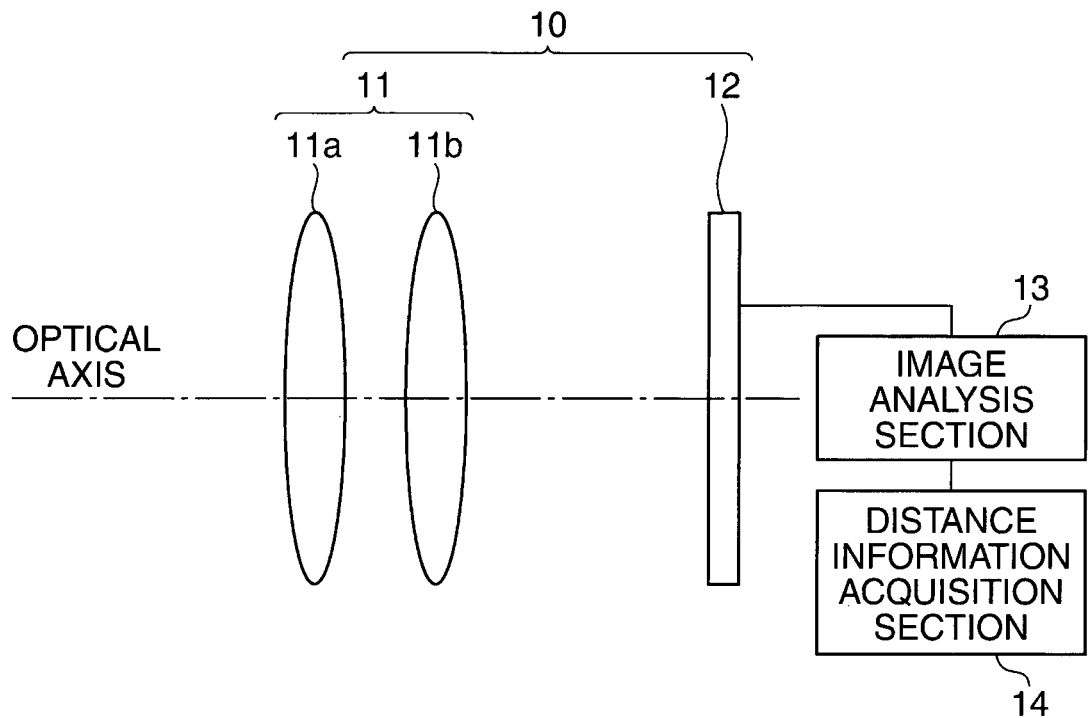
FIG. 1 is a block diagram schematically showing a configuration of a ranging apparatus according to a first embodiment of the present invention.

First, a first embodiment of the present invention will be described. FIG. 1 is a block diagram schematically showing a configuration of a ranging apparatus according to the first embodiment of the present invention.

Figure 2:
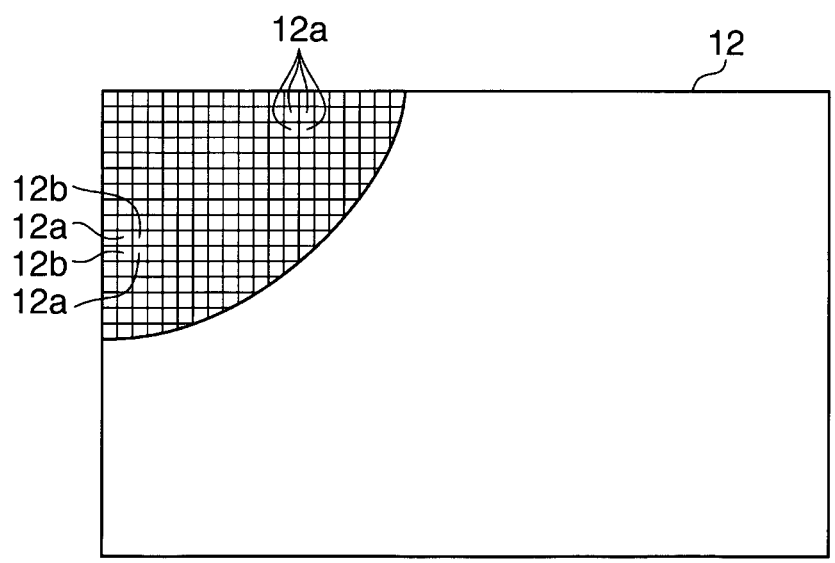
FIG. 2 is a front view schematically showing a configuration of an image pickup device in FIG. 1.

In FIG. 1, the ranging apparatus includes a camera 10 which has an optical system 11 and an image pickup device 12 comprising a plurality of pixels arranged therein, an image analysis section 13, and a distance information acquisition section 14. The optical system 11 includes, for example, two lenses 11a and 11b which are arranged along an optical axis and forms an optical image of an object on the image pickup device 12. As shown in FIG. 2, the pixels of the image pickup device 12 are divided into a plurality of image pickup pixels 12a and a plurality of ranging pixels 12b (first pixels and second pixels). It should be noted that the arrangement of the pixels at the left and upper side is partially shown and the arrangement of the pixels of the entire surface of the image pickup device 12 is not shown in FIG. 2 in order to prevent the complexity of FIG. 2. Each of the image pickup pixels 12a and the ranging pixels 12b includes a photoelectric conversion device, for example, a photodiode (hereinafter, referred to as a "PD") which is one photoelectric conversion part. In this embodiment, for example, the PD is comprised of a photoelectric conversion film made from silicon or made of a thin film having optical absorption characteristic. The image pickup pixels 12a respectively receive light fluxes passing through corresponding partial areas (which are different areas in an exit pupil and will be hereinafter referred to as "partial pupils") of the exit pupil of the optical system 11 and form in cooperation an optical image of an object. Further, each of the ranging pixels 12b receives any one of the light fluxes passing through two different partial pupils in the exit pupil of the optical system 11. In the image pickup device 12, for example, the image pickup pixels 12a having a spectral sensitivity of G (green) are disposed at diagonal positions as two pixels among four pixels of two rows by two columns in accordance with a Bayer array and the image pickup pixels 12a respectively having the spectral sensitivities of R (red) and B (blue) are disposed one by one as the other two pixels. The spectral sensitivity of specific color of each image pickup pixel 12a is given by a color filter of primary color of each image pickup pixel 12a. Further, in the image pickup device 12, two image pickup pixels 12a having spectral sensitivities of G at diagonal positions are left and the image pickup pixels 12a having spectral sensitivities of R and B are replaced by the ranging pixels 12b in some of the pixels of two rows by two columns. In the image pickup device 12, two ranging pixels 12b at diagonal positions in some of the pixels of two rows by two columns form a pair of optical images by respectively receiving the light fluxes having passed through two corresponding partial pupils and further photoelectrically convert the optical images to an image signal (an electric signal) and output the image signal. The image analysis section 13 performs an image process on the output image signal. The distance information acquisition section 14 calculates a parallax of the pair of optical images from the image signal subjected to the image process and further calculates a distance to an object on the basis of the calculated parallax. That is, the ranging apparatus measures the distance to the object by an imaging plane phase difference method. It should be noted that the image process does not need to be essentially performed on the image signal output from the image pickup device 12 when the parallax is calculated from the image signal. For example, in a case where the parallax can be directly calculated from the image signal, the image pickup device 12 directly outputs the image signal to the distance information acquisition section 14 without passing the image analysis section 13.

In the image pickup device 12, two ranging pixels 12b form the pair of optical images by respectively receiving the light fluxes respectively having passed through the partial pupils, but one image pickup/ranging pixel 12c to be described later may form the pair of optical images by receiving the light fluxes having passed through two partial pupils. In this case, the image pickup/ranging pixel 12c includes at least two PDs and two PDs respectively receive the light fluxes having passed through two partial pupils. Further, the image pickup/ranging pixel 12c forms the optical image of the object by synthesizing the light fluxes having passed through two partial pupils and received by two PDs. Thus, the image pickup/ranging pixel 12c may be disposed in a substantially entire area of the image pickup device 12. It should be noted that a so-called autofocus function is omitted since the lenses 11a and 11b of the optical system 11 are fixed to the camera 10 in the present embodiment. That is, a focus is fixed in the camera 10. However, the camera 10 may have the autofocus function. In this case, the autofocus is performed on the basis of the distance to the object calculated by the distance information acquisition section 14.

Figure 3A:
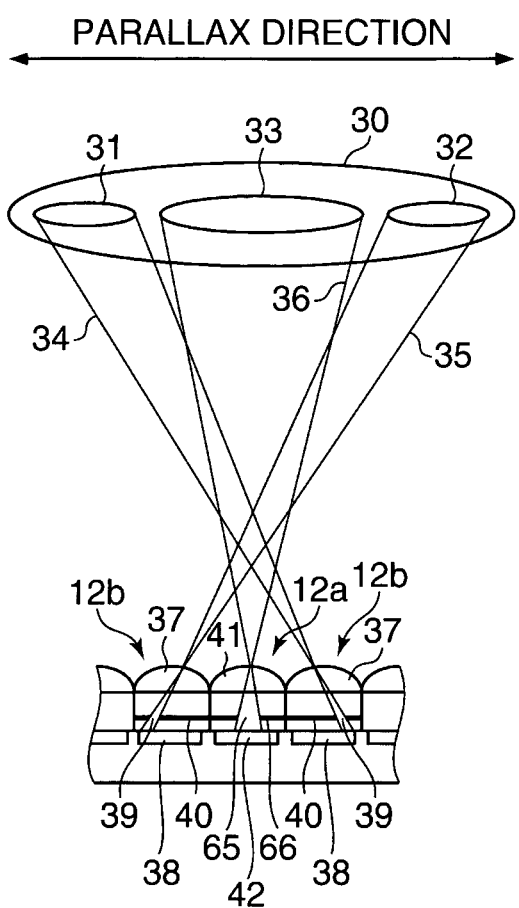
FIGS. 3A to 3C are diagrams illustrating a distance measurement principle of an imaging plane phase difference method.
Figure 3B:
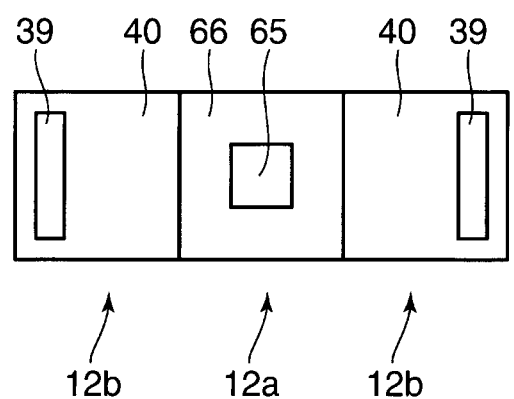
Figure 3C:
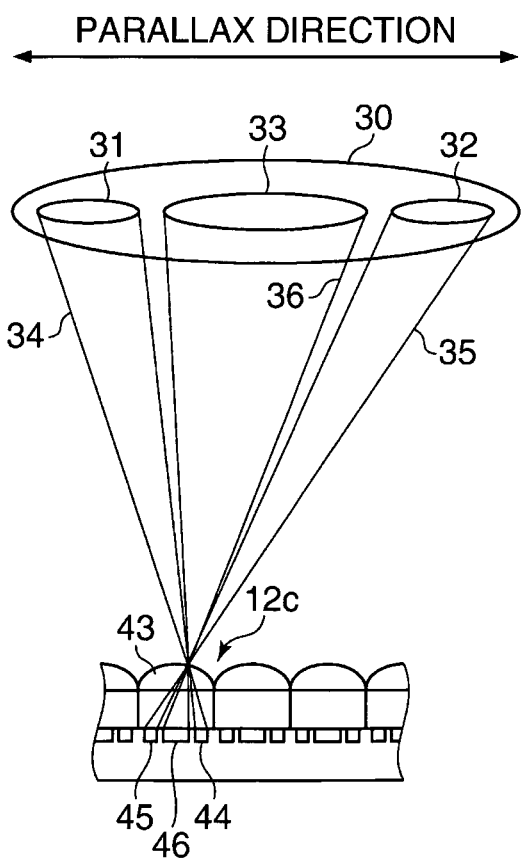

FIGS. 3A to 3C are diagrams illustrating a distance measurement principle of the imaging plane phase difference method. Specifically, FIG. 3A shows a case where a distance is measured using the optical images respectively formed by two ranging pixels 12b formed as a pair of pixels. FIG. 3B shows a case where the pixels of FIG. 3A are viewed in an optical axis direction. FIG. 3C shows a case where a distance is measured using the pair of optical images formed by one image pickup/ranging pixel 12c. It should be noted that the image pickup pixel 12a in FIGS. 3A and 3C is depicted in a state where the ranging pixel 12b or the image pickup/ranging pixel 12c is viewed from the lateral side.

First, in FIG. 3A, an exit pupil 30 of the optical system 11 includes two partial pupils (hereinafter, referred to as "ranging pupils") 31 and 32 which are respectively positioned in the vicinity of both edges of the exit pupil 30 in a horizontal direction (which is a lateral direction in FIG. 3A, a first direction) (hereinafter, referred to as a "parallax direction"). Further, the exit pupil 30 includes a partial pupil (hereinafter, referred to as an "image pickup pupil") 33 which is positioned at the substantially center of the exit pupil 30 to be interposed between the ranging pupils 31 and 32 in the parallax direction. Ranging light fluxes 34 and 35 (first and second light fluxes) are respectively emitted from the ranging pupils 31 and 32 and are respectively incident to the pair of ranging pixels 12b. Further, an image pickup light flux 36 is emitted from the image pickup pupil 33 and is incident to the image pickup pixel 12a. Two ranging pixels 12b include respectively micro lenses 37 (first and second micro lenses) and PDs 38 (first and second photoelectric conversion parts) which face the exit pupil 30 through the micro lenses 37. Further, two ranging pixels 12b include respectively light shielding films 40 (first and second light shielding films) each of which is disposed between the micro lens 37 and the PD 38 and which include openings 39 (first or second opening) formed so that the PD 38 partially faces the micro lens 37. The opening 39 (the first opening) of the image pickup pixel 12b at the left side of FIG. 3B is eccentrically disposed in the parallax direction (the first direction) from the center thereof and the optical axis of the corresponding micro lens 37. Further, the opening 39 (the second opening) of the image pickup pixel 12b at the right side of FIG. 3B is eccentrically disposed in the parallax direction (the second direction opposite to the first direction) from the center thereof and the optical axis of the corresponding micro lens 37. Additionally, the PD 38 of the image pickup pixel 12b at the left side of FIG. 3B and the PD 38 of the image pickup pixel 12b at the right side of FIG. 3B have different incident angle sensitivity characteristics. It should be noted that a center of a pixel in the claims and the specification is a center of gravity of a pixel. For example, in a case where the pixel is rectangular, an intersection point of two diagonal lines corresponds to the center of the pixel. The image pickup pixel 12a includes a micro lens 41 and a PD 42 which faces the exit pupil 30 through the micro lens 41. Further, the image pickup pixel 12a includes a light shielding film 66 (a third light shielding film) which is disposed between the micro lens 41 and the PD 42 and includes an opening 65 (a third opening) formed so that the PD 42 partially faces the micro lens 41. The opening 65 (the third opening) of the image pickup pixel 12a is disposed on the center of the pixel or the optical axis of the micro lens 41. It should be noted that the incident angle sensitivity characteristic of the PD 42 of the image pickup pixel 12a is different from that of the PD 38 of each of two image pickup pixels 12b.

In the pair of ranging pixels 12b, two micro lenses 37 are disposed in the vicinity of the imaging surface of the optical system 11 and the micro lenses 37 respectively collect the ranging light fluxes 34 and 35 toward two light shielding films 40 (the openings 39). The optical system 11 and two micro lenses 37 are formed so that the exit pupil 30 and two light shielding films 40 (the openings 39) are optically conjugated. Thus, the shapes of the openings 39 of two light shielding films 40 are respectively projected to two ranging pupils 31 and 32 of the exit pupil 30 by two micro lenses 37. That is, the arrangement (the position and the size) of two ranging pupils 31 and 32 is determined by the positions and the sizes of the openings 39 of the light shielding films 40. Further, in the image pickup pixel 12a, the micro lens 41 is disposed in the vicinity of the imaging surface of the optical system 11 and the optical system 11 and the micro lens 41 are formed so that the exit pupil 30 and the light shielding film 66 (the opening 65) are optically conjugated. Thus, the shape of the opening 65 is projected to the image pickup pupil 33 of the exit pupil 30 by the micro lens 41. That is, the arrangement (the position and the size) of the image pickup pupil 33 is determined by the position and the size of the opening 65 of the light shielding film 66. Two PDs 38 of the pair of ranging pixels 12b output image signals obtained by the conversion of the optical images formed on the micro lenses 37 by the ranging light fluxes 34 and 35 respectively having passed through the ranging pupils 31 and 32. An image displacement detection calculation process (a correlation process and a phase difference detection process) or the like is performed on the output image signals so that the parallax of the pair of optical images is calculated. Further, a defocus amount and a distance to an object is calculated using a principle of triangulation (for example, see US Patent No. 2015/0092988) from the calculated parallax. Further, the PD 42 of the image pickup pixel 12a outputs an image signal obtained by the conversion of the optical image formed on the micro lens 41 by the image pickup light flux 36 passing through the image pickup pupil 33 and an object image is formed from the image signal. It should be noted that the light shielding film 40 and the light shielding film 66 are provided in FIGS. 3A and 3B, but these light shielding films may be omitted. In this case, by setting the position and the size of the PD 38 or the PD 42 to be the same as the position and the size of the opening 39 or the opening 65, the arrangement of the ranging pupils 31 and 32 or the arrangement of the image pickup pupil 33 can be realized.

Further, in FIG. 3C, the ranging light fluxes 34 and 35 are respectively emitted from the ranging pupils 31 and 32 and are incident to the image pickup/ranging pixel 12c. The image pickup light flux 36 is emitted from the image pickup pupil 33 and is incident to the same image pickup/ranging pixel 12c. The image pickup/ranging pixel 12c includes a micro lens 43 and PDs 44 to 46 which face the exit pupil 30 through the micro lens 43. In the image pickup/ranging pixel 12c, the micro lens 43 is disposed in the vicinity of the imaging surface of the optical system 11 and the micro lens 43 collects the ranging light fluxes 34 and 35 toward two PDs 44 and 45. The optical system 11 and the micro lens 43 are formed so that the exit pupil 30 and the PDs 44 to 46 are optically conjugated. Thus, the shape of the PD 44 is projected to the ranging pupil 31 of the exit pupil 30 by the micro lens 43. Further, the shape of the PD 45 is projected to the ranging pupil 32 of the exit pupil 30 by the micro lens 43. The shape of the PD 46 is projected to the image pickup pupil 33 of the exit pupil 30 by the micro lens 43. That is, the arrangement (the positions and the sizes) of the ranging pupils 31 and 32 and the image pickup pupil 33 is determined by the positions and the sizes of the PDs 44 to 46. The PDs 44 and 45 of the image pickup/ranging pixel 12c output image signals obtained through the conversion of the optical images formed on the micro lenses 43 by the ranging light fluxes 34 and 35 respectively having passed through the ranging pupils 31 and 32. Even here, an image displacement detection calculation process (a correlation process and a phase difference detection process) or the like is performed on the output image signal so that the parallax of the pair of optical images is calculated. Further, a defocus amount and a distance to an object is calculated using a principle of triangulation. Additionally, the PD 46 of the image pickup/ranging pixel 12c outputs an image signal obtained through the conversion of the optical image formed on the micro lens 43 by the image pickup light flux 36 passing through the image pickup pupil 33. It should be noted that the PDs 44 to 46 have different incident angle sensitivity characteristics.

Figure 4A:
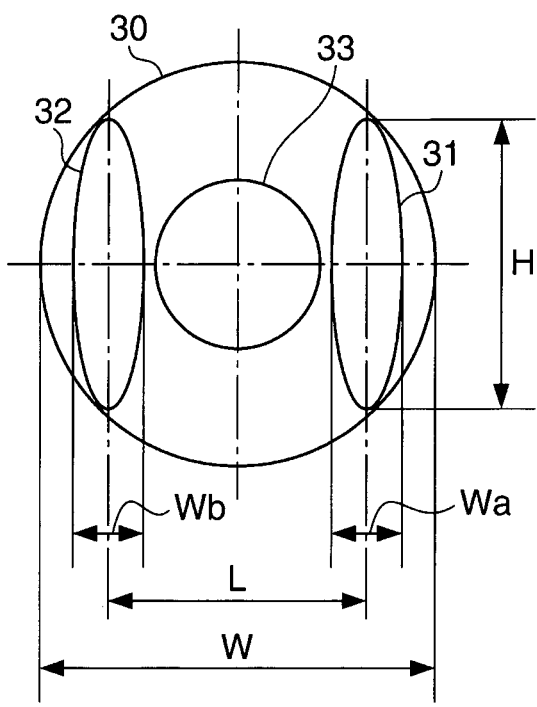
FIGS. 4A to 4C are diagrams showing an exit pupil of an optical system in the first embodiment of the present invention.
Figure 4B:
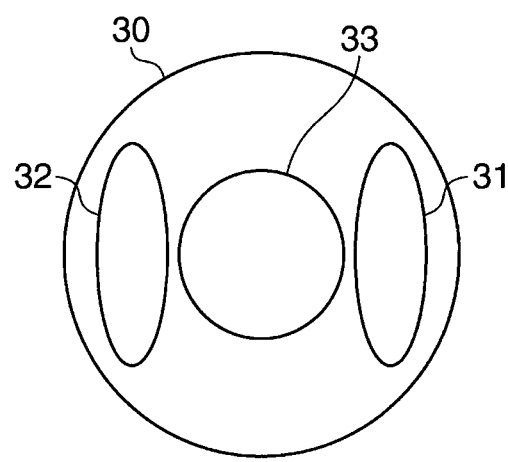
Figure 4C:
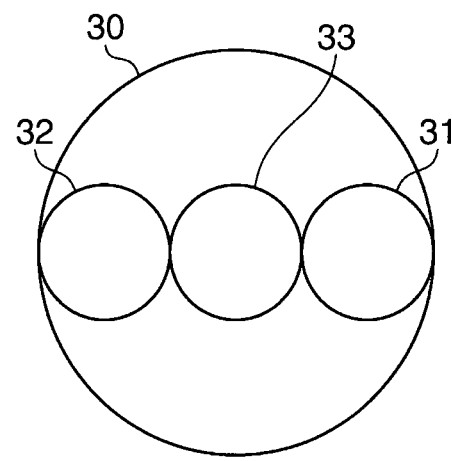

FIGS. 4A to 4C are diagrams showing the exit pupil of the optical system of the first embodiment of the present invention. It should be noted that the lateral direction in the drawings corresponds to the parallax direction.

In FIG. 4A, the exit pupil 30 includes the two oval ranging pupils 31 and 32 which are positioned to be symmetrical to each other in the parallax direction with respect to the center of the exit pupil 30 (the optical axis of the optical system 11) and are respectively positioned in the vicinity of both edges of the exit pupil 30. Further, the exit pupil 30 includes the regular circular image pickup pupil 33 which is positioned at the substantially center of the exit pupil 30 to be interposed between the ranging pupils 31 and 32 in the parallax direction. A ratio of a center-to-center distance L of the ranging pupils 31 and 32 in the parallax direction with respect to an exit pupil width W which is a length of the exit pupil 30 in the parallax direction is equal to or larger than 0.6 and equal to or smaller than 0.9. Further, a ratio of each of ranging pupil widths Wa and Wb (partial pupil widths) which are lengths of the ranging pupils 31 and 32 in the parallax direction with respect to the exit pupil width W is equal to or larger than 0.1 and equal to or smaller than 0.4. The oval ranging pupils 31 and 32 include long sides in a longitudinal direction (a direction perpendicular to the parallax direction) in FIG. 4A. A ratio (hereinafter, referred to as an "aspect ratio") of each of ranging pupil heights H (partial pupil heights) which are lengths of the ranging pupils 31 and 32 in the longitudinal direction in FIG. 4A with respect to each of the ranging pupil widths Wa and Wb is 1 or more and preferably 2 or more. The sizes or the shapes of the ranging pupils 31 and 32 can be arbitrarily set in accordance with the limitation on each of the ranging pupil widths Wa and Wb and the ranging pupil height H and, for example, as shown in FIG. 4B, the ranging pupils 31 and 32 may be slightly small. Further, as shown in FIG. 4C, each of the ranging pupils 31 and 32 and the image pickup pupil 33 may have the same shape (the regular circular shape). However, the sizes of the ranging pupils 31 and 32 need to be set to sizes in which the intensities of the image signals based on the ranging light fluxes 34 and 35 respectively having passed through the ranging pupils 31 and 32 increase to a degree in which accurate object distance information can be acquired.

According to the present embodiment, since a ratio of the center-to-center distance L (the base line length) of the ranging pupils 31 and 32 in the parallax direction with respect to the exit pupil width W of the exit pupil 30 is equal to or larger than 0.6 and equal to or smaller than 0.9, the base line length can be increased. As a result, the accuracy of the distance to the object measured by the imaging plane phase difference method can be improved. Further, since a ratio of each of the ranging pupil widths Wa and Wb with respect to the exit pupil width W is equal to or larger than 0.1 and equal to or smaller than 0.4, a degree of freedom in the arrangement of the ranging pupils 31 and 32 in the parallax direction of the exit pupil 30 can be improved. As a result, since the ranging pupils 31 and 32 can be respectively positioned in the vicinity of both edges of the exit pupil 30 in the parallax direction, the base line length can be reliably increased. Further, when the ranging pupil widths Wa and Wb are too small, the light amount of the ranging light fluxes 34 and 35 remarkably decreases and thus the S/N ratio of the obtained ranging image signal decreases. Therefore, the accuracy of the measured distance is deteriorated. However, since a ratio of each of the ranging pupil widths Wa and Wb with respect to the exit pupil width W is 0.1 or more as described above, it is possible to prevent a remarkable decrease in light amount of each of the ranging light fluxes 34 and 35. Further, when the ranging pupil widths Wa and Wb increase, that is, the ranging pupils 31 and 32 increase in size, the base line length is shortened and thus the accuracy of the measured distance is deteriorated. However, since a ratio of each of the ranging pupil widths Wa and Wb with respect to the exit pupil width W is 0.4 or less as described above, it is possible to prevent the base line length from being shortened. Further, since the aspect ratio of each of the ranging pupils 31 and 32 is 1 or more, it is possible to increase the amount of the ranging light fluxes 34 and 35 respectively passing through the ranging pupils 31 and 32. Accordingly, since it is possible to increase the S/N ratio of the image signal obtained from the optical image formed by the ranging light fluxes 34 and 35, it is possible to high-accurately obtain the object distance information. Further, the exit pupil 30 includes the image pickup pupil 33 which is interposed between the ranging pupils 31 and 32 in the parallax direction and the object image is formed from the image signal obtained by the conversion of the optical image formed by the image pickup light flux 36 passing through the image pickup pupil 33. Accordingly, since it is possible to decrease the aperture compared to the case where the light flux passing through the entire area of the exit pupil 30 is used, a focus depth of the object can be increased so that an object image suitable for a recognition process can be obtained.

Figure 5A:
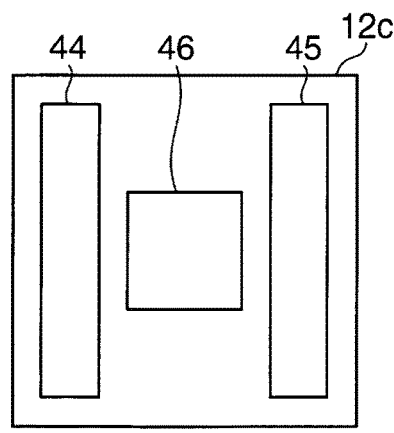
FIGS. 5A and 5B are diagrams illustrating an arrangement of PDs of an image pickup/ranging pixel.

As described above, the arrangement of two ranging pupils 31 and 32 is determined by the positions and the sizes of the openings 39 of two light shielding films 40 of two ranging pixels 12b and the arrangement of the image pickup pupil 33 is determined by the position and the size of the opening 65 of the light shielding film 66 of the image pickup pixel 12a. Alternatively, the arrangement of two ranging pupils 31 and 32 and the image pickup pupil 33 is determined by the positions and the sizes of the PDs 44 to 46 of the image pickup/ranging pixel 12c. Thus, in the image pickup/ranging pixel 12c, as shown in FIG. 5A, two PDs 44 and 45 are formed in a rectangular shape having a long side in a longitudinal direction (a direction perpendicular to the parallax direction) in FIG. 5A such as to respectively correspond to the longitudinal ranging pupils 31 and 32. Further, two PDs 44 and 45 are disposed while being separated from each other in the parallax direction such as to respectively correspond to two ranging pupils 31 and 32 positioned in the vicinity of both edges of the exit pupil 30. Furthermore, the PD 46 is formed in a square shape such as to correspond to the regular circular image pickup pupil 33 and the PD 46 is disposed at the substantially center of the image pickup/ranging pixel 12c such as to correspond to the image pickup pupil 33 positioned at the substantially center of the exit pupil 30. As shown in FIG. 5A, in a case where one image pickup/ranging pixel 12c includes two PDs 44 and 45, one image pickup/ranging pixel 12c can provides one image signal so that many image signals for calculating the parallax of the pair of optical image can be obtained totally from the image pickup device 12. Hence, the resolution of the image signal can be improved. Accordingly, the formed image can have high quality. Further, the resolution of the distance information can be improved.

Figure 5B:
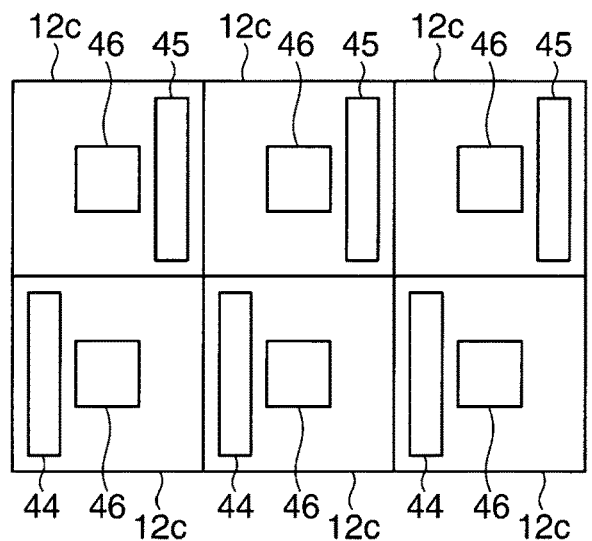

It should be noted that the image pickup/ranging pixel 12c may include only one of the PD 44 and the PD 45. For example, as shown in FIG. 5B, one image pickup/ranging pixel 12c (at the lower side in FIG. 5B) includes the PD 44 and another image pickup/ranging pixel 12c (at the upper side in FIG. 5) includes the PD 45. In this case, the ranging light flux 34 passing through the ranging pupil 31 is received by the PD 44 of the one image pickup/ranging pixel 12c and the PD 44 outputs an image signal obtained by the conversion of the optical image formed by the ranging light flux 34. Further, the ranging light flux 35 passing through the ranging pupil 32 is received by the PD 45 of the other image pickup/ranging pixel 12c and the PD 45 outputs an image signal obtained by the conversion of the optical image formed by the ranging light flux 35. In addition, the parallax of the pair of optical images is calculated from the image signals output from the PD 44 of the one image pickup/ranging pixel 12c and the PD 45 of the other image pickup/ranging pixel 12c. As shown in FIG. 5B, in a case where the image pickup/ranging pixel 12c includes only one of the PD 44 and the PD 45, the number of the PDs of one image pickup/ranging pixel 12c can be decreased to two. Accordingly, since the PDs can be disposed with allowance, the PDs can be increased in size. As a result, the light receiving amount of the PDs increases so that the sensitivities of the PDs can be improved. Accordingly, even in an environment in which the light amount is not sufficient, the formed image can have high quality and thus distance calculation accuracy can be improved.

Figure 6A:
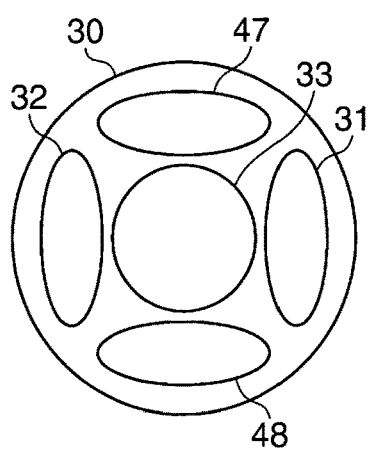
FIGS. 6A and 6B are diagrams illustrating a variation of an arrangement of PDs of the image pickup/ranging pixel and a variation of the exit pupil of the optical system.
Figure 6B:
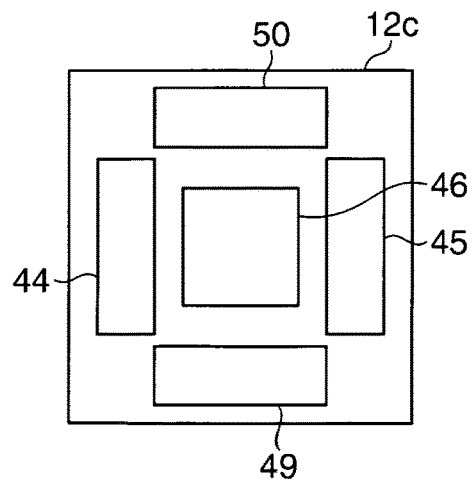

In the present embodiment, it should be noted that the exit pupil 30 includes the ranging pupils 31 and 32 disposed in the lateral direction in FIGS. 4A to 4C, but may further include two ranging pupils disposed in the longitudinal direction in FIGS. 4A to 4C. For example, as shown in FIG. 6A, the exit pupil 30 includes two oval ranging pupils 47 and 48 which are arranged in the longitudinal direction in FIG. 6A in addition to the ranging pupils 31 and 32. Two ranging pupils 47 and 48 are respectively positioned in the vicinity of both edges of the exit pupil 30 in the longitudinal direction in FIG. 6A. Accordingly, since the parallax of the pair of optical images in the longitudinal direction in FIG. 6A as well as that in the lateral direction in FIG. 6A can be calculated, the accuracy of measurement of the distance to the horizontal line or the diagonal line in the object can be improved. In this case, as shown in FIG. 6B, the image pickup/ranging pixel 12c includes PDs 49 and 50 formed in a rectangular shape having a long side in the lateral direction in FIG. 6B such as to correspond to the two ranging pupils 47 and 48 each having an oval shape. Further, the two PDs 49 and 50 are disposed while being separated from each other in the longitudinal direction in FIG. 6B such as to correspond to two ranging pupils 47 and 48 respectively positioned in the vicinity of both edges of the exit pupil 30 in the longitudinal direction in FIG. 6B.

Further, in the present embodiment, the image pickup pixel 12a includes the color filter having primary color, but the color filter may have complementary color instead of primary color. Since the light amount of the light flux having passed through the color filter having complementary color is larger than that of the color filter having primary color, the sensitivity of the PD 42 can be improved. Meanwhile, the light flux received by the PD 38 in the ranging pixel 12b is limited to the light flux passing through the opening 39 and the sizes of the PDs 44 and 45 in the image pickup/ranging pixel 12c are limited. However, the ranging pixel 12b and the image pickup/ranging pixel 12c does not include the color filter or includes the color filter having complementary color. Accordingly, the light amount of the light flux received by the PD 38 or the PDs 44 and 45 is not particularly limited. Thus, the sensitivity of the PD 38 or the PDs 44 and 45 does not remarkably decrease.

Next, a second embodiment of the present invention will be described. Since the configuration and operation of the second embodiment of the present invention are basically the same as those of the above-described first embodiment, a description of repetitive configurations and operations will be omitted and different configurations and operations will be described.

Figure 7A:
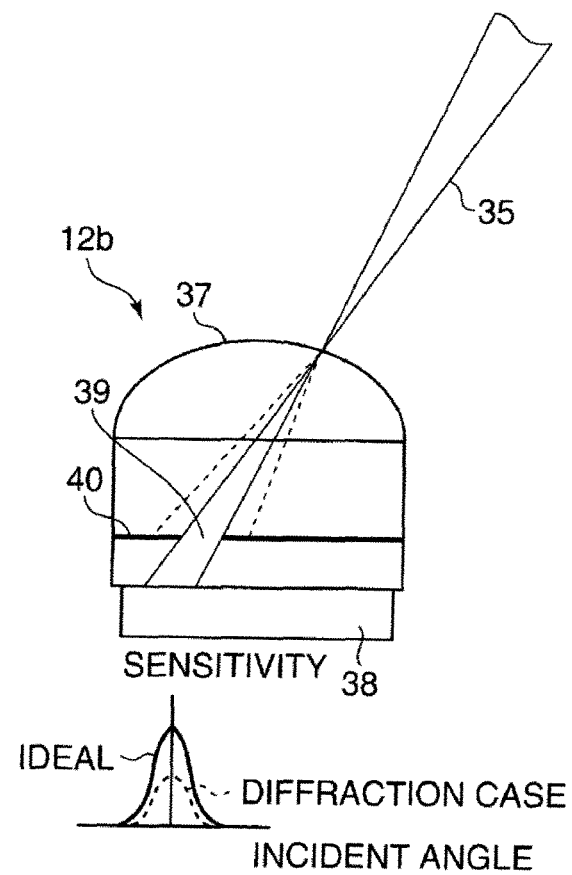
FIGS. 7A to 7C are diagrams illustrating a state of an aperture of a ranging light flux in a second embodiment of the present invention.

In a case where a ranging apparatus is applied to a moving object, for example, an automobile or a drone, it is preferable to further decrease the size and the weight of the ranging apparatus and it is necessary to further decrease the size of the camera 10. At this time, the image pickup device 12 is further decreased in size and the image pickup pixel 12a and the ranging pixel 12b of the image pickup device 12 is further decreased in size. Here, if the ranging pixel 12b decreases in size so that the size of the pixel (the pixel size) becomes several times the wavelength of the visual light, the ranging light fluxes 34 and 35 incident to the micro lenses 37 diffuse due to the diffraction. Specifically, the ranging light flux 35 incident to the micro lens 37 is diffracted as shown in FIG. 7A such that the ranging light flux 35 diffuses (see a light flux indicated by a dashed line in FIG. 7A) compared to the ranging light flux 35 (see the light flux indicated by the solid line in the drawings) when the pixel size is enough large and the diffraction hardly occurs. Accordingly, the light amount of the light flux passing through the opening 39 decreases and the light receiving amount of the ranging light flux 35 received by the PD 38 decreases so that the sensitivity of the PD 38 for the ranging light flux 35 is deteriorated. As a result, an absolute value of the sensitivity of the incident angle sensitivity characteristic (see a characteristic indicated by a dashed line in FIG. 7A) when the ranging light flux 35 diffuses due to the diffraction decreases compared to the incident angle sensitivity characteristic (see a characteristic indicated by a solid line in FIG. 7A) when a pixel size is enough large and the diffraction hardly occurs. Then, since the SNR (the S/N ratio) of the obtained image signal decreases, distance measurement accuracy is deteriorated. Further, in a case where the ranging light flux 35 received by the PD 38 is used to form an object image, the quality of the formed object image is deteriorated and thus recognition accuracy in recognition process is deteriorated. It should be noted that, in a graph indicating the incident angle sensitivity characteristic in FIG. 7A, an abscissa axis represents the sensitivity and a longitudinal axis represents the incident angle, and an incident angle in a cross point at which the abscissa axis and the longitudinal axis intersect with each other represents a main light ray incident angle of the ranging light flux 35.

Figure 7B:
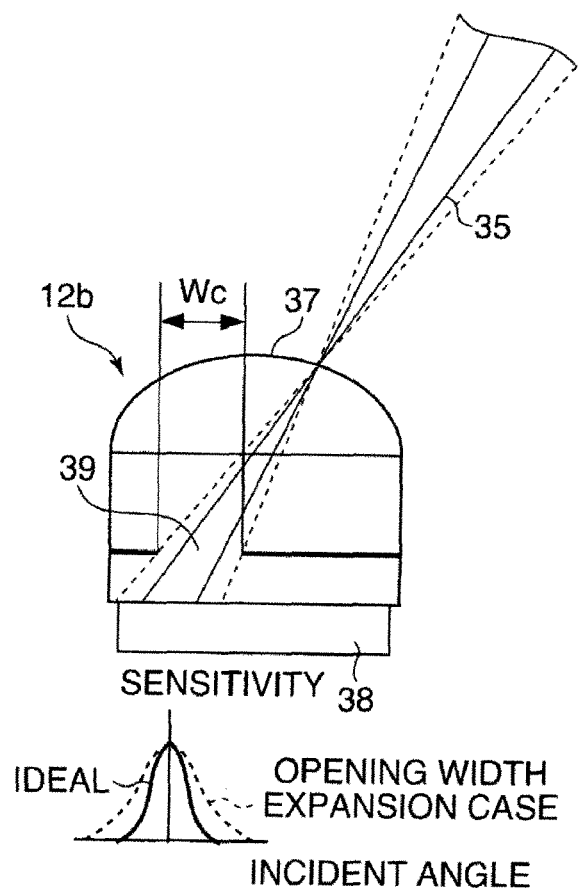

In order to improve the sensitivity of the PD 38 with respect to the ranging light flux 35, it is preferable to increase the light amount of the light flux passing through the opening 39 by expanding the width Wc of the opening 39 as shown in FIG. 7B. However, when the width Wc of the opening 39 is expanded, the range of the incident angle of the light flux capable of having passed through the opening 39 is also widened (see a light flux indicated by a dashed line in FIG. 7B). As a result, since the range of the incident angle of the incident angle sensitivity characteristic (see a characteristic indicated by a dashed line in FIG. 7B) when the width Wc of the opening 39 is expanded is widened compared to the incident angle sensitivity characteristic (see a characteristic indicated by a solid line in FIG. 7) in the ideal state, the base line length is shortened and thus distance measurement accuracy is deteriorated.

Figure 7C:
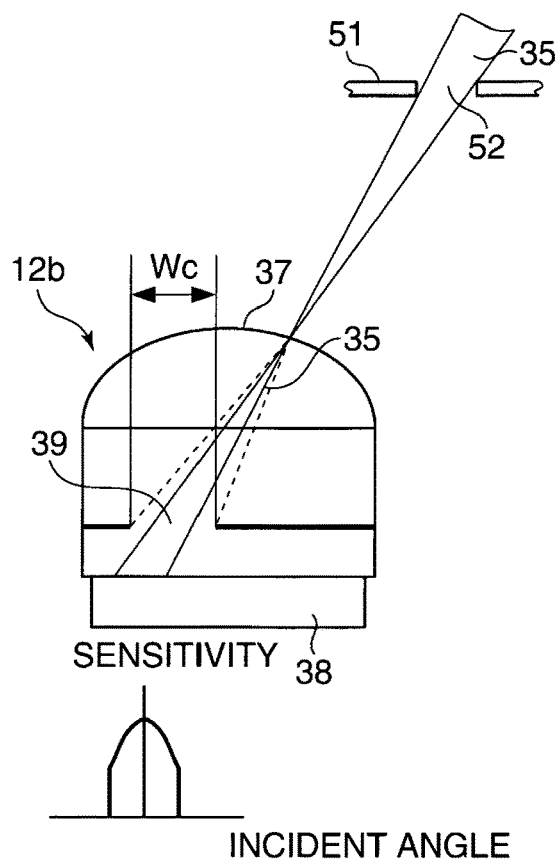

In the present embodiment, to cope with this matter, the range of the incident angle of the incident angle sensitivity characteristic is limited while the width Wc of the opening 39 is expanded so as to improve the sensitivity of the PD 38 as shown in FIG. 7C. That is, the distribution (width) of the incident angle of the ranging light flux 35 is limited in such a manner that the ranging light flux 35 is narrowed in order to limit the incident angle of the light flux passing through the opening 39 (see a light flux indicated by a solid line in FIG. 7C). Specifically, the incident angle range of the ranging light flux 35 (the incident angle distribution on the imaging surface of the optical system 11) is narrowed by applying an aperture hole 52 of an aperture 51. At this time, even when the ranging light flux 35 having passed through the aperture hole 52 is diffracted by the micro lens 37, the ranging light flux 35 on the light shielding film 40 (the first light shielding film) does not diffuse compared to the opening 39 having an expanded width Wc. As a result, the PD 38 can sufficiently receive the ranging light flux 35. By applying a similar measure, the PD 38 can also sufficiently receive the ranging light flux 34. With the above-described configuration, since it is possible to narrow the range of the incident angle of the incident angle sensitivity characteristic while maintaining the absolute value of the sensitivity of the incident angle sensitivity characteristic at a high degree, it is possible to prevent deterioration in distance measurement accuracy.

Figure 8A:
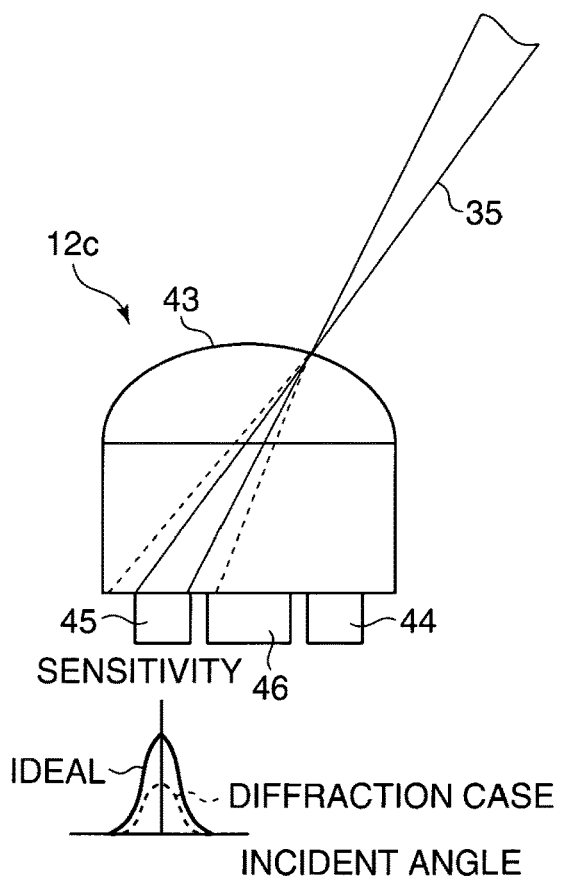
FIGS. 8A to 8C are diagrams illustrating a state of an aperture of a ranging light flux in the second embodiment of the present invention.

Further, even when the image pickup/ranging pixel 12c decreases in size and, for example, the pixel size becomes about several times of the wavelength of the visual light, the ranging light fluxes 34 and 35 incident to the micro lenses 43 further diffuse due to the diffraction. Specifically, as shown in FIG. 8A, the ranging light flux 35 incident to the micro lens 43 diffuses due to the diffraction (see a light flux indicated by a dashed line in FIG. 8A) compared to the ranging light flux 35 (see a light flux indicated by a solid line in FIG. 8A) when the pixel size is enough large and the diffraction hardly occurs. Accordingly, the light amount of the ranging light flux 35 received by the PD 45 decreases and the sensitivity of the PD 45 with respect to the ranging light flux 35 is deteriorated. As a result, an absolute value of the sensitivity of the incident angle sensitivity characteristic (see a characteristic indicated by a dashed line in FIG. 8A) when the ranging light flux 35 diffuses due to the diffraction decreases compared to the incident angle sensitivity characteristic (see a characteristic indicated by a solid line in FIG. 8A) when the pixel size is enough large and the diffraction hardly occurs. Then, since the SNR of the obtained image signal decreases, distance measurement accuracy is deteriorated. Further, in a case where the ranging light flux 35 received by the PD 45 is used to form an object image, the quality of the formed object image is deteriorated and thus recognition accuracy in recognition process is deteriorated.

Figure 8B:
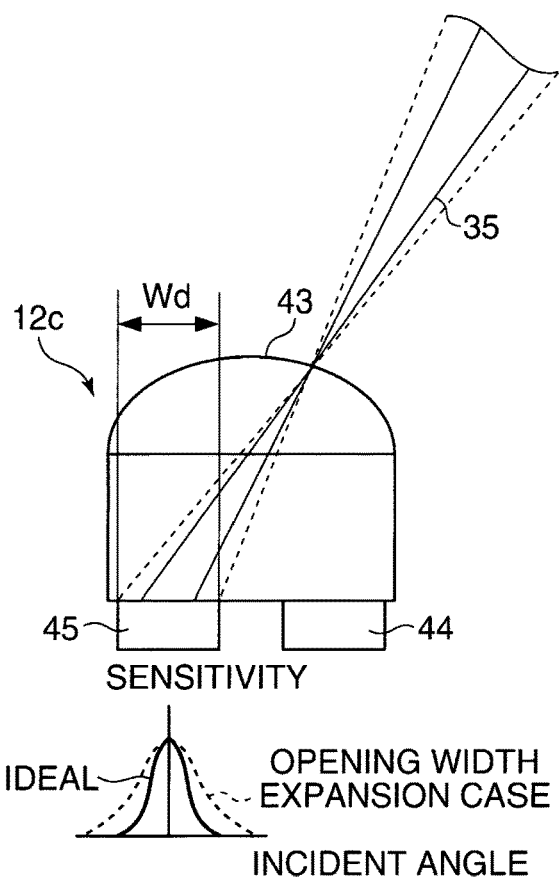

In order to improve the sensitivity of the PD 45 with respect to the ranging light flux 35, it is preferable to increase the light amount of the light flux received by the PD 45 by expanding the width Wd of the PD 45 as shown in FIG. 8B. However, when the width Wd of the PD 45 is expanded, the range of the incident angle of the light flux which can be incident to the PD 45 is also widened (see a light flux indicated by a dashed line in FIG. 8B). As a result, since the range of the incident angle of the incident angle sensitivity characteristic (see a characteristic indicated by a dashed line in FIG. 8B) when the width Wd of the PD 45 is expanded is widened compared to the incident angle sensitivity characteristic (see a characteristic indicated by a solid line in FIG. 8B) in the ideal state, the base line length is shortened and thus distance measurement accuracy is deteriorated.

Figure 8C:
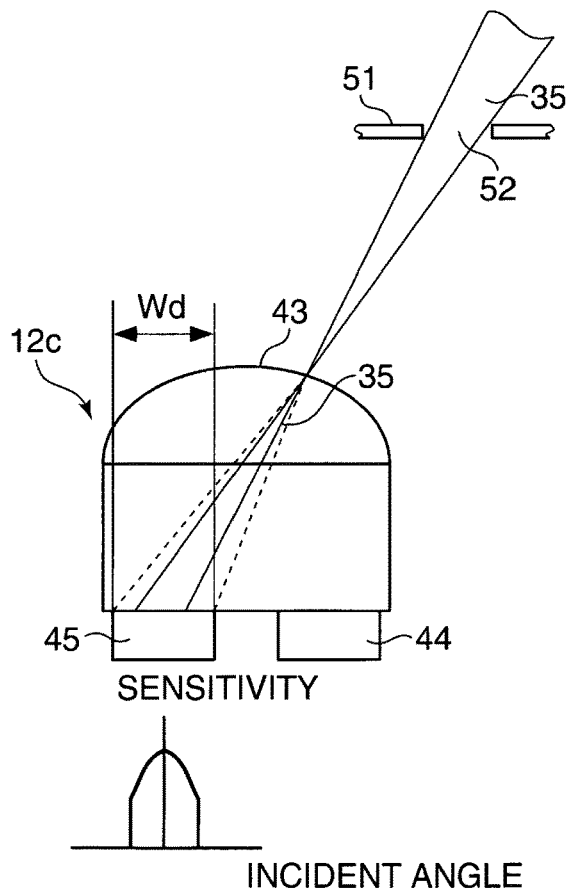

In the present embodiment, to cope with this matter, the range of the incident angle of the incident angle sensitivity characteristic is limited while the width Wd of the PD 45 is expanded so as to improve the sensitivity of the PD 45 as shown in FIG. 8C. That is, the distribution (width) of the incident angle of the ranging light flux 35 is limited in such a manner that the ranging light flux 35 is narrowed in order to limit the incident angle of the light flux incident to the PD 45 (see a light flux indicated by a solid line in FIG. 8C). Specifically, the incident angle range of the ranging light flux 35 (the incident angle distribution on the imaging surface of the optical system 11) is narrowed by applying the aperture hole 52 of the aperture 51. At this time, even when the ranging light flux 35 having passed through the aperture hole 52 is diffracted by the micro lens 37, the ranging light flux 35 on a plane including the PD 45 does not diffuse compared to the PD 45 having an expanded width Wd. As a result, the PD 45 can sufficiently receive the ranging light flux 35. By applying a similar measure, the PD 44 can also sufficiently receive the ranging light flux 34. With the above-described configuration, since it is possible to narrow the range of the incident angle of the incident angle sensitivity characteristic while maintaining the absolute value of the sensitivity of the incident angle sensitivity characteristic at a high degree, it is possible to improve distance measurement accuracy.

Figure 9:
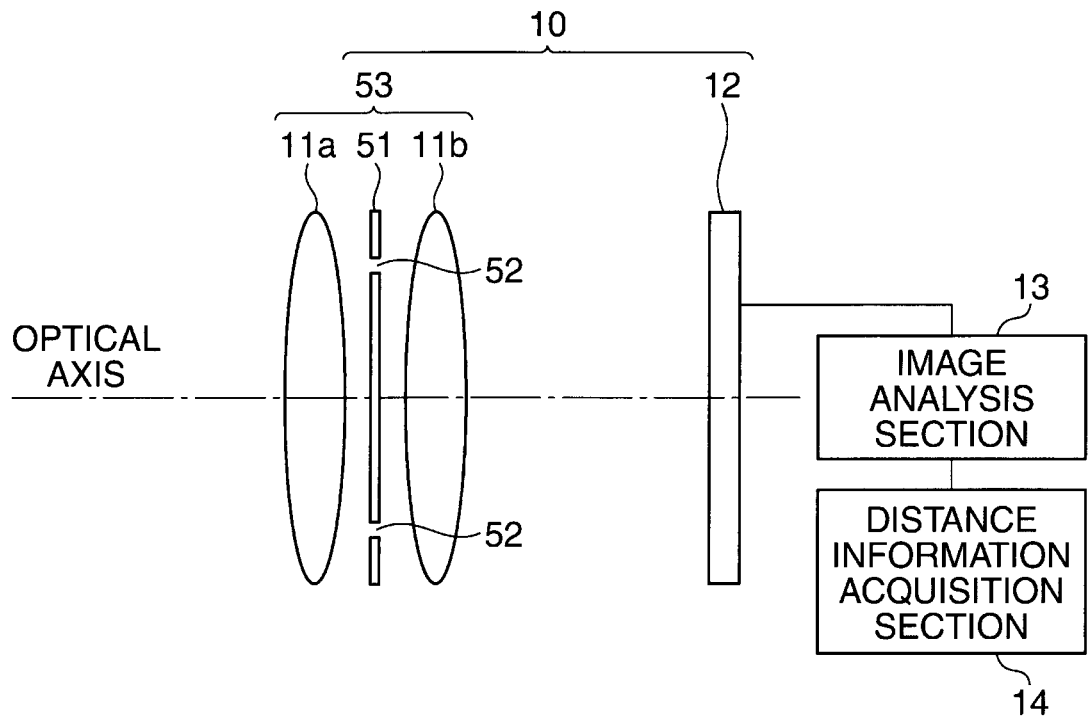
FIG. 9 is a block diagram schematically showing a configuration of a ranging apparatus according to the second embodiment of the present invention.

FIG. 9 is a block diagram schematically showing a configuration of the ranging apparatus according to the second embodiment of the present invention. In FIG. 9, the ranging apparatus includes the camera 10 which includes an optical system 53 and the image pickup device 12 having a plurality of pixels arranged therein, the image analysis section 13, and the distance information acquisition section 14. The optical system 53 includes, for example, two lenses 11a and 11b which are arranged along the optical axis and forms an optical image of an object on the image pickup device 12. Further, the optical system 53 includes the aperture 51 disposed between two lenses 11a and 11b. The aperture 51 includes two aperture holes 52 corresponding to two ranging pupils 31 and 32. In a case where the ranging pixels 12b are disposed in the image pickup device 12, the optical system 53 and the micro lens 37 are formed so that two aperture holes 52 of the aperture 51 and the light shielding film 40 (the opening 39) are optically conjugated. Further, in a case where the image pickup/ranging pixels 12c are disposed in the image pickup device 12, the optical system 53 and the micro lens 43 are formed so that two aperture holes 52 of the aperture 51 and the PDs 44 and 45 are optically conjugated.

Figure 10:
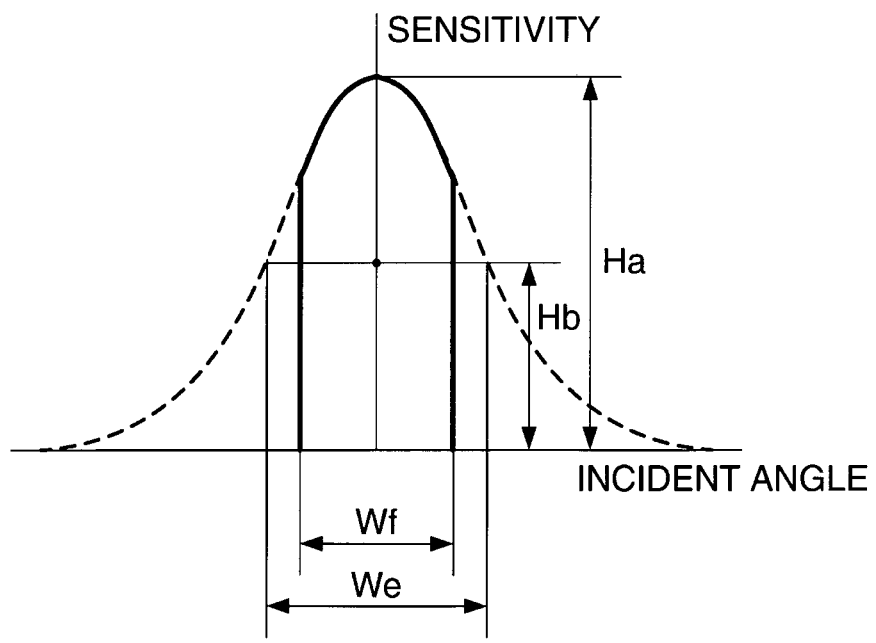
FIG. 10 is a diagram illustrating a limitation of an incident angle range of a ranging light flux by an aperture hole.
Figure 11:
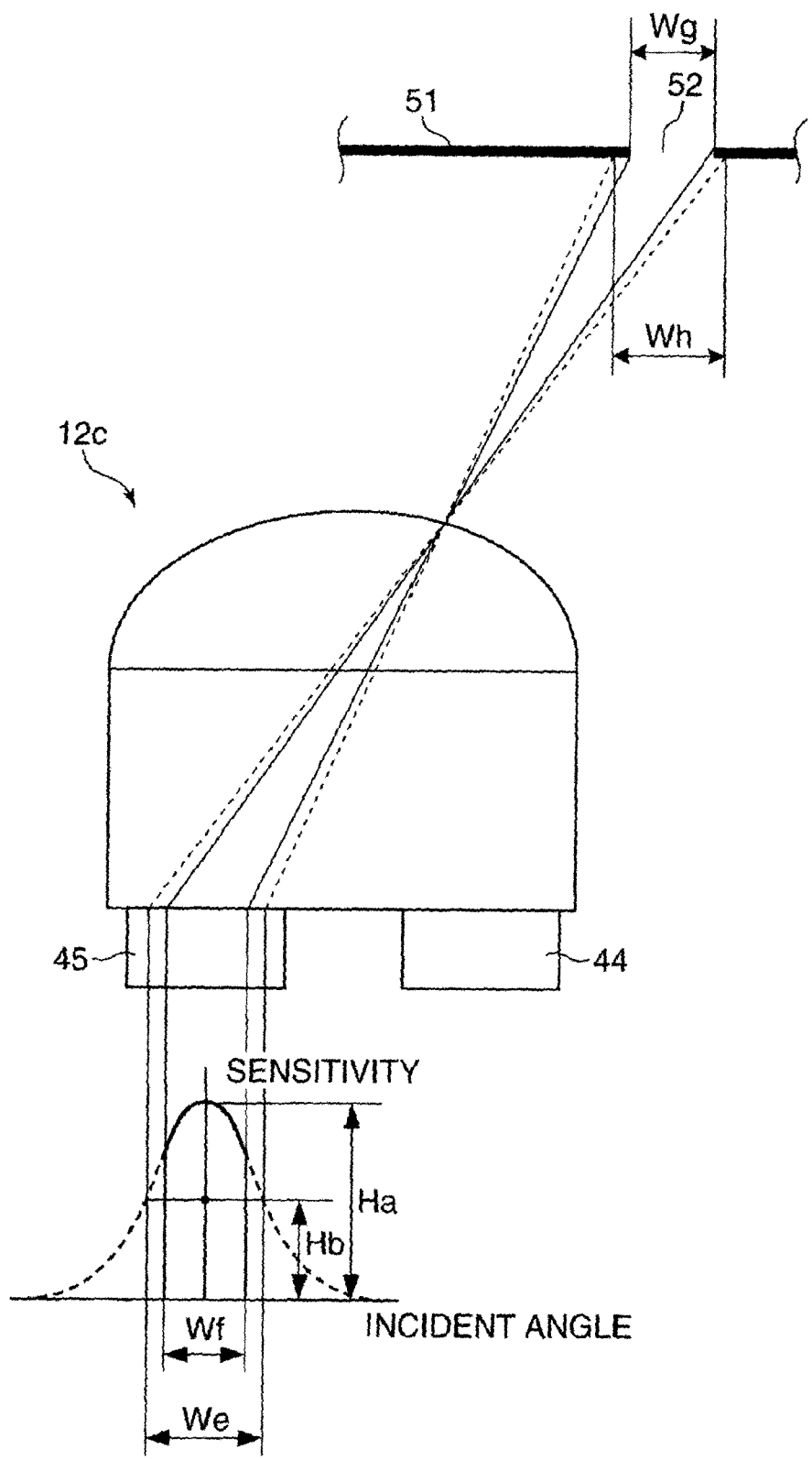
FIG. 11 is a diagram illustrating a limitation of an incident angle range of a ranging light flux by an aperture hole.

As described above, two aperture holes 52 define the ranging light fluxes 34 and 35 passing through the ranging pupils 31 and 32. For example, as shown in FIG. 10, the aperture holes 52 realize the incident angle sensitivity characteristic of which the range of the incident angle is limited (hereinafter, referred to as a "limited incident angle sensitivity characteristic") (see a characteristic indicated by a solid line in FIG. 10) by defining the incident angle ranges of the ranging light fluxes 34 and 35. At this time, a half value width of the incident angle sensitivity characteristic of the opening 39 having an expanded width We or the PDs 44 and 45 each having an expanded width Wd (hereinafter, referred to as an "incident angle sensitivity characteristic in the case of an expanded width") (see a characteristic indicated by a dashed line) is indicated by We. The half value width We indicates the incident angle range when the sensitivity of the incident angle sensitivity characteristic in the case of the expanded width becomes a half sensitivity Hb of a maximal sensitivity Ha. Further, a half value width of the limited incident angle sensitivity characteristic is indicated by Wf. The half value width Wf indicates the incident angle range when the sensitivity of the limited incident angle sensitivity characteristic becomes the half sensitivity Hb of the maximal sensitivity Ha. In the present embodiment, the size (the width in the parallax direction) of each aperture hole 52 is defined so that the half value width Wf of the limited incident angle sensitivity characteristic becomes smaller than the half value width We of the incident angle sensitivity characteristic in the case of the expanded width. Specifically, in a case where the image pickup/ranging pixels 12c are disposed in the image pickup device 12, as shown in FIG. 11, the width of each aperture hole 52 in the parallax direction (the lateral direction in FIG. 11) is indicated by Wg. At this time, the width Wg is defined so that the width Wg becomes smaller than a width Wh at the aperture 51 in the parallax direction of a light flux (see a light flux indicated by a dashed line in FIG. 11) having a incident angle corresponding to the half value width We of the incident angle sensitivity characteristic in the case of the expanded width. Further, the sizes, the shapes, or the positions of two aperture holes 52 are defined so that the ranging light fluxes 34 and 35 have the same polarization state and the same wavelength.

Figure 12A:
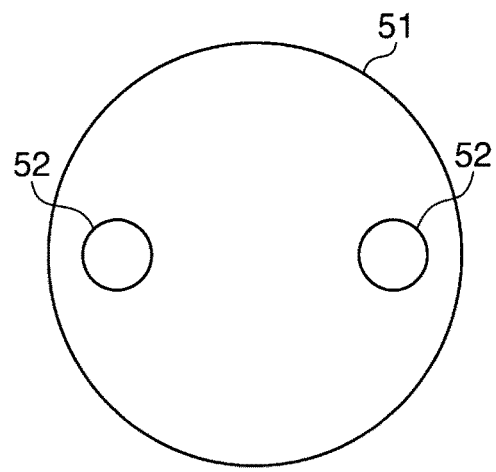
FIGS. 12A to 12E are diagrams showing an aperture in FIG. 9 when viewed in an optical axis direction.
Figure 12B:
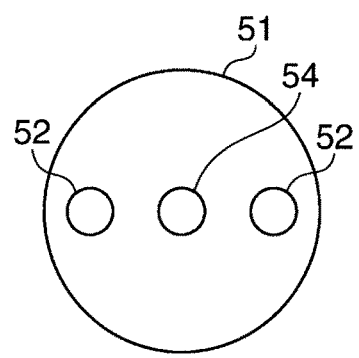
Figure 12C:
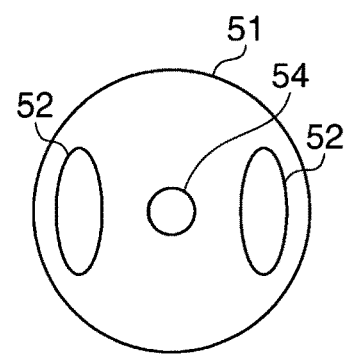
Figure 12D:
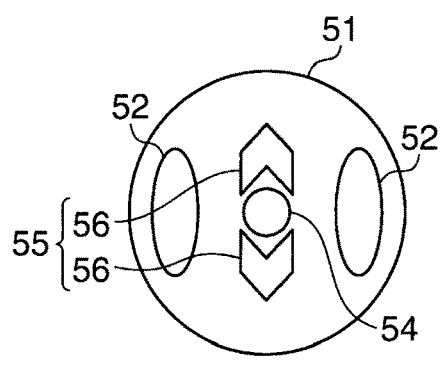
Figure 12E:
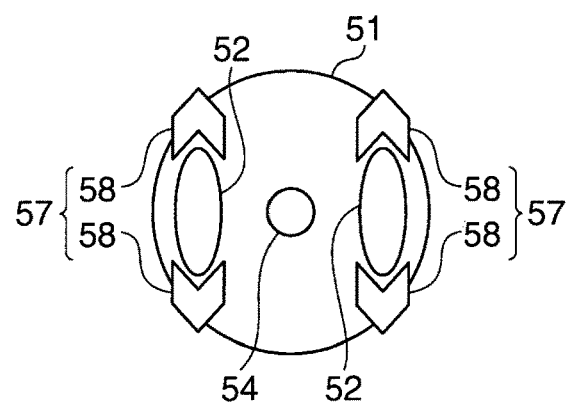

FIGS. 12A to 12E are diagrams showing the aperture in FIG. 9 when viewed in the optical axis direction. In FIG. 12A, the disk-shaped aperture 51 includes two aperture holes 52 (the first aperture hole and the second aperture hole) which are disposed to be separated from each other within the diameter in the parallax direction (the lateral direction in FIG. 12A). The positions, the sizes, and the shapes of two aperture holes 52 are set to realize the positions, the sizes, and the shapes of the ranging pupils 31 and 32. It should be noted that the image pickup light flux 36 is not generated when the aperture 51 includes only two aperture holes 52 as shown in FIG. 12A. Thus, the ranging light fluxes 34 and 35 are used to form the object image while to be used for measuring the distance to the object. As shown in FIG. 12B, the aperture 51 may include another aperture hole 54 (a third aperture hole) at the substantially center in addition to two aperture holes 52. In this case, the position, the size, and the shape of the other aperture hole 54 is set to realize the position, the size, and the shape of the image pickup pupil 33. Further, the shape of each aperture hole 52 is not particularly limited, but as shown in FIG. 12C, a ratio of the longitudinal length, that is, the length of each aperture hole 52 in a direction (the longitudinal direction in FIG. 12C) perpendicular to the parallax direction with respect to the length in the parallax direction may be 1 or more. In this case, since the aspect ratio of each of the ranging pupils 31 and 32 can be set to 1 or more, it is possible to increase the intensities of the image signals obtained from the ranging light fluxes 34 and 35 by increasing the amount of the ranging light fluxes 34 and 35 respectively passing through the ranging pupils 31 and 32. Further, as shown in FIG. 12D, the aperture 51 may include an aperture mechanism 55 which adjusts an opening of the other aperture hole 54. The aperture mechanism 55 includes two shielding blades 56 and each shielding blade 56 is slidable in the longitudinal direction in FIG. 12D. Accordingly, since it is possible to narrow the image pickup light flux 36 passing through the image pickup pupil 33, it is possible to increase a focus depth of the object and to easily obtain a high-quality object image. Further, as shown in FIG. 12E, the aperture 51 may include an aperture mechanism 57 which adjusts an opening of the aperture hole 52. Each aperture mechanism 57 includes two shielding blades 58 and each shielding blade 58 is slidable in the longitudinal direction in FIG. 12E. Accordingly, it is possible to freely adjust the light amount of the ranging light fluxes 34 and 35 respectively passing through the ranging pupils 31 and 32.

It should be noted that the opening of the aperture (the opening aperture) 51 is described as the "aperture hole 52" in the present embodiment, but the opening of the aperture 51 may not be essentially a through-hole. That is, the aperture may be comprised of a transparent glass plate with a light shielding film formed thereon and may be comprised of a liquid crystal shutter or an electrochromic device. Further, in the present embodiment, the transmission type opening aperture is exemplified as the aperture 51, but a reflection type opening aperture may be applied instead. In this case, a member in which a part excluding an aperture hole on a mirror is covered by a light absorbing material may be applied or a member in which a part of an aperture hole on a plate (a metal plate) not reflecting light is covered by a mirror may be applied. In the claims and the specification, a part (a transparent glass and a mirror) which corresponds to the aperture hole of the reflection type opening aperture will be also interpreted as the "aperture hole".

Next, a third embodiment of the present invention will be described. In the third embodiment of the present invention, the ranging apparatuses according to the first embodiment and the second embodiment are applied to an automobile which is a moving object.

Figure 13:
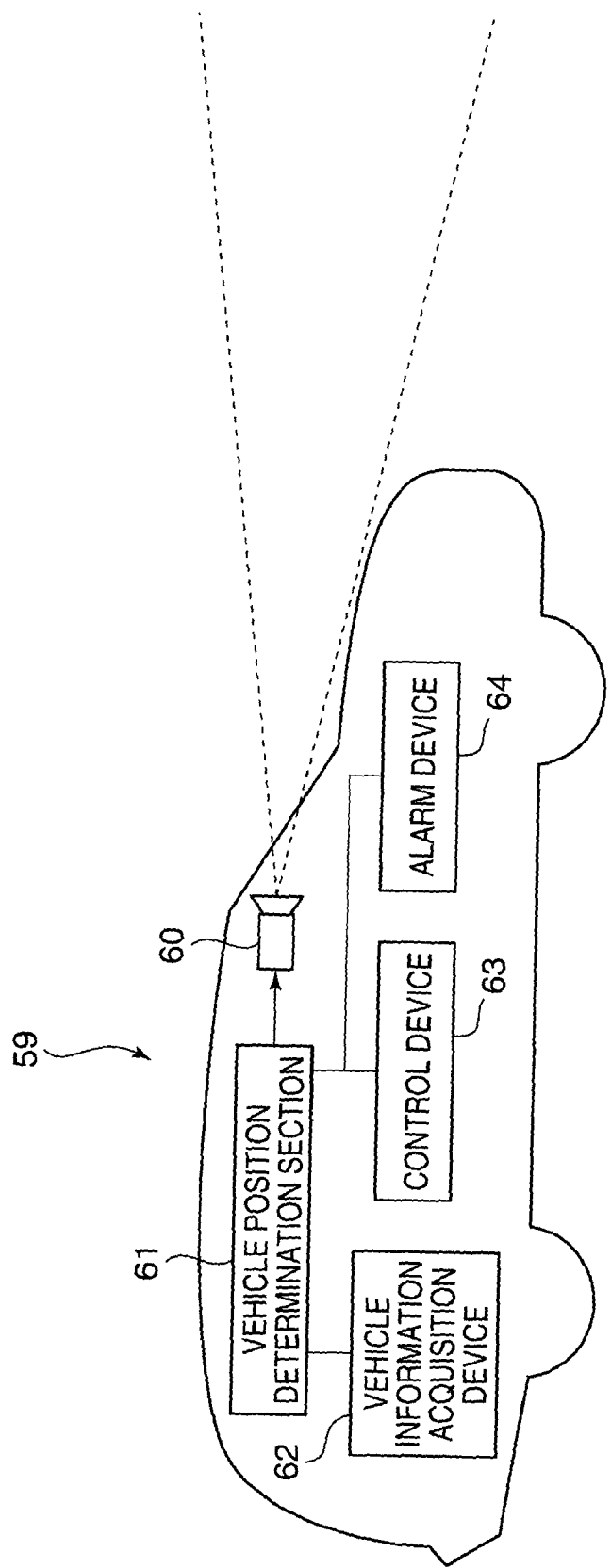
FIG. 13 is a diagram schematically illustrating a configuration of a driving assistance system in an automobile which is a moving object according to the present embodiment.
Figure 14:
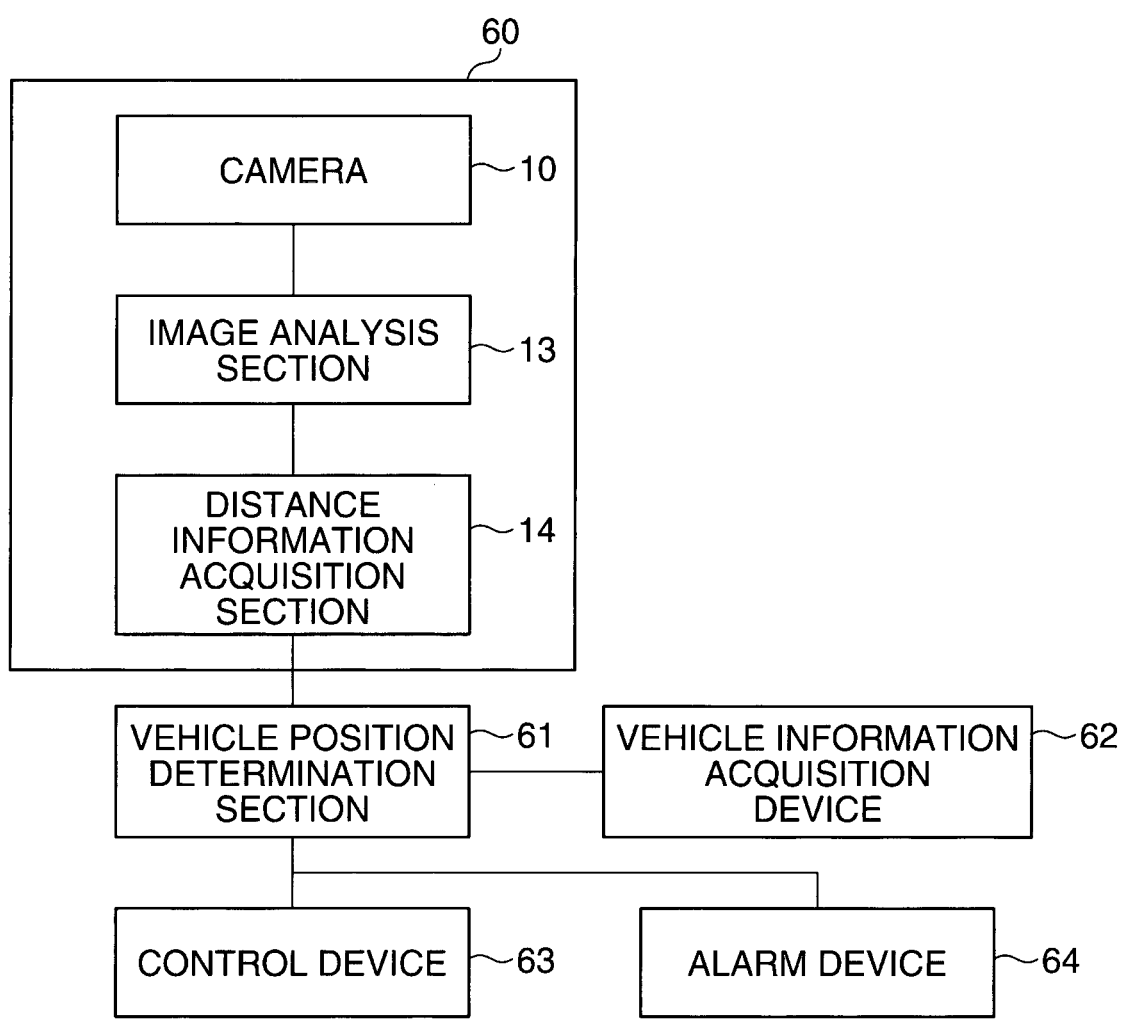
FIG. 14 is a diagram schematically illustrating the configuration of the driving assistance system in the automobile which is the moving object according to the present embodiment.

FIGS. 13 and 14 are diagrams schematically illustrating a configuration of a driving assistance system of an automobile which is a moving object according to the present embodiment.

In FIGS. 13 and 14, a vehicle 59 includes a ranging apparatus 60 including the camera 10, the image analysis section 13, and the distance information acquisition section 14 and a vehicle position determination section 61. The vehicle position determination section 61 determines a relative position of the vehicle 59 with respect to a forerunning vehicle on the basis of a distance measurement result, for example, a distance to the forerunning vehicle calculated by the ranging apparatus 60. It should be noted that the image analysis section 13, the distance information acquisition section 14, and the vehicle position determination section 61 can be embodied by software (a program) or hardware, whereas being embodied by a combination of software and hardware. For example, a process of each part can be realized in such a manner that a program is stored in a memory of a computer (a microcomputer, an FPGA, or the like) embedded in the camera 10 and the program is executed by the computer. Further, a dedicated processor such as ASIC which realizes a part or the entirety of processes executed by respective parts using a logic circuit.

Further, the vehicle 59 includes a vehicle information acquisition device 62 (a moving object information acquisition device), a control device 63, and an alarm device 64. The vehicle position determination section 61 is connected to the vehicle information acquisition device 62, the control device 63, and the alarm device 64. The vehicle position determination section 61 acquires any one of parameters including a vehicle speed (a speed), a yaw rate, and a rudder angle of the vehicle 59 as vehicle information (moving object information) from the vehicle information acquisition device 62. The control device 63 controls the vehicle 59 on the basis of a determination result of the vehicle position determination section 61. The alarm device 64 generates an alarm on the basis of a determination result of the vehicle position determination section 61. The control device 63 is, for example, an ECU (Engine Control Unit). For example, when there is a high possibility of a collision with a forerunning vehicle as a determination result of the vehicle position determination section 61, the control device 63 performs a vehicle control of avoiding a collision and reducing damage by enabling a brake, disabling an accelerator, and suppressing an engine output in the vehicle 59. Further, for example, when there is a high possibility of a collision with the forerunning vehicle, the alarm device 64 warns the user by generating an alarm such as a sound, displaying alarm information on a screen of a car aviation system or the like, or vibrating a safety belt or a steering wheel. In the present embodiment, the camera 10 of the ranging apparatus 60 picks up an image in the periphery of the vehicle 59, for example, in front or rear of the vehicle. It should be noted that the control device 63 may control the vehicle 59 on the basis of the vehicle information acquired by the vehicle information acquisition device 62 as well as the distance measurement result of the ranging apparatus 60.

Figure 15:
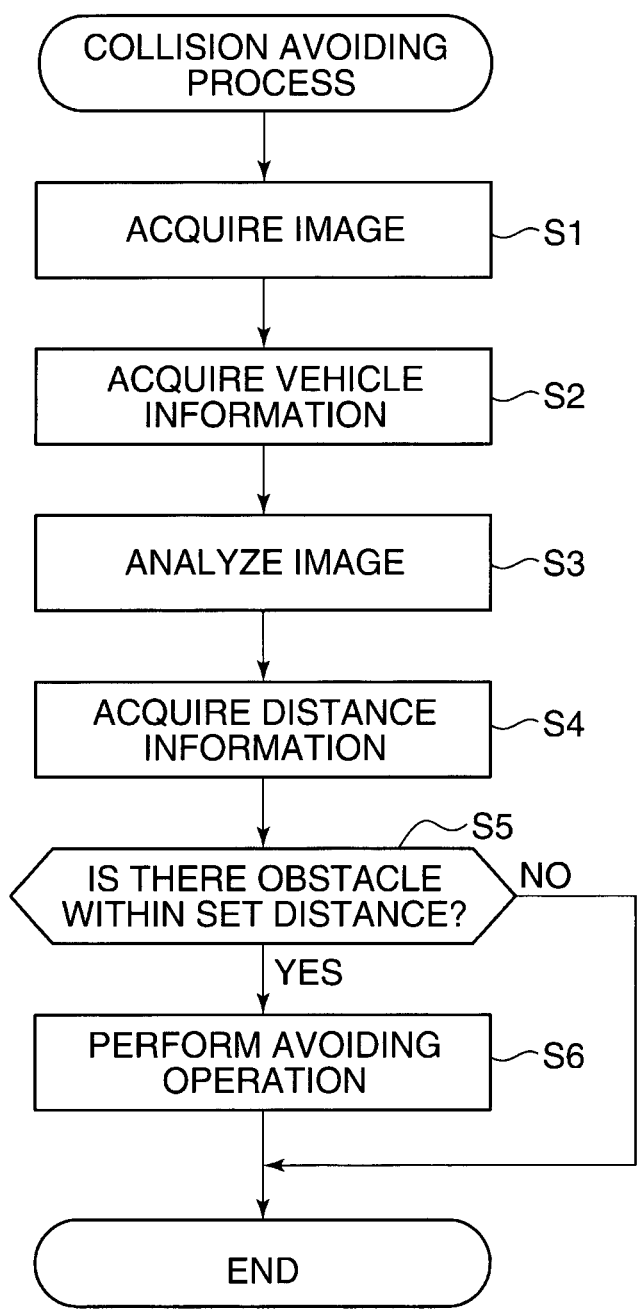
FIG. 15 is a flowchart showing a collision avoiding process which is an operation example of the driving assistance system of the present embodiment.
Figure 16:
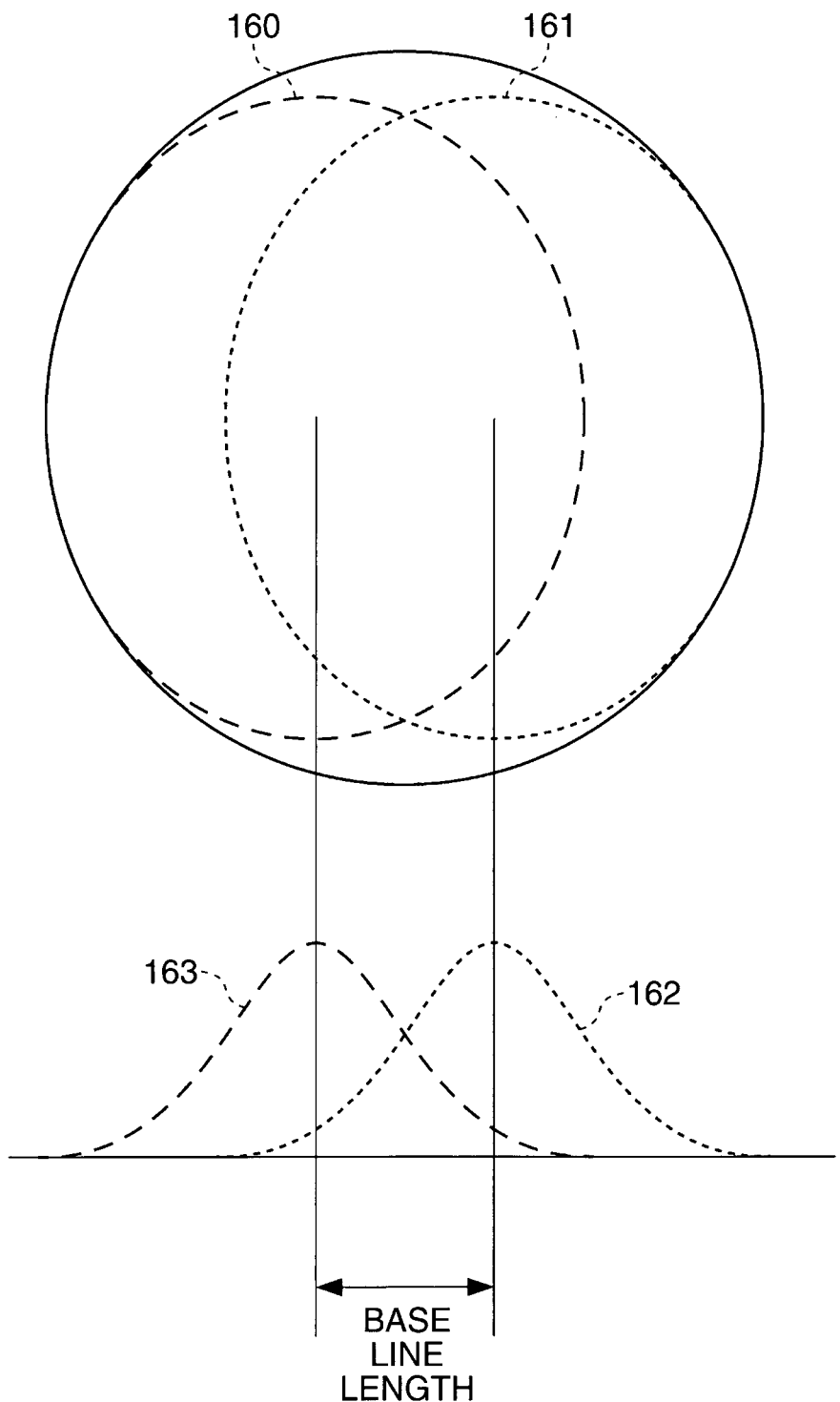
FIG. 16 is a diagram illustrating a relation between a base line length and two partial pupils of an exit pupil of an optical system.

FIG. 15 is a flowchart showing a collision avoiding process which is an operation example of the driving assistance system of the present embodiment. An operation of each part of the driving assistance system will be described according to this flowchart.

First, in step S1, image signals of a plurality of images (for example, two images for distance measurement and one image for pickup image) are acquired by the camera 10. Next, in step S2, vehicle information is acquired from the vehicle information acquisition device 62. The vehicle information herein is information including any one of the parameters of the vehicle speed, the yaw rate, and the rudder angle of the vehicle 59. Next, a feature analysis (a recognition process) is performed on at least one of the image signals acquired in step S3. Specifically, the image analysis section 13 analyzes feature amounts such as an edge amount, an edge direction, a density value, a color value, and a luminance value of the image signal so as to recognize (detect) an object (an automobile, a bicycle, a pedestrian, a vehicle lane, a guardrail, a brake lamp, and the like). It should be noted that the feature amount analysis of the image may be performed for each of the image signals or only a part of the image signals (for example, only one image signal for pickup image) among the image signals.

Subsequently, in step S4, a parallax of the images acquired by the camera 10 is acquired by the distance information acquisition section 14 so as to acquire distance information to an object existing on the pickup image. The distance information is acquired by the distance information acquisition section 14. It should be noted that a detailed description of the parallax calculation method will not be made in the present embodiment since the calculation method is widely known as an SSDA method or an area correlation method. It should be noted that the parallax may be acquired through execution of steps S2, S3, and S4 in such a manner that steps are executed sequentially or in parallel. Here, a defocus amount or a distance to the object existing on the pickup image can be calculated from the parallax obtained in step S4 and internal and external parameters of the camera 10. In the present embodiment, the distance information is defined as object distance information on a distance to an object, a defocus amount, and a parallax (a phase deviation amount). It should be noted that the distance information is also called depth information.

Next, in step S5, the possibility of a front or rear collision is determined by determining whether the obtained distance information is within a predetermined range, that is, an obstacle exists within a set distance. When the obstacle exists within the set distance, the possibility of the collision is determined and the control device 63 performs an avoiding operation of the vehicle 59 (step S6). Specifically, the possibility of the collision is notified to the control device 63 and the alarm device 64. At this time, the control device 63 controls at least one of the moving direction and the moving speed of the vehicle 59. For example, a control signal of operating a brake, that is, a control signal of braking wheels of the vehicle 59 is generated and transmitted so that the output of an engine is suppressed. In this way, the collision with the forerunning vehicle is avoided and the possibility of the collision is reduced. Further, the alarm device 64 notifies a risk to the user in terms of a sound, an image, or a vibration. Next, the present process terminates. Meanwhile, when the obstacle does not exist within the set distance, it is determined that the possibility of a collision does not exist and the present process terminates.

According to the process of FIG. 15, it is possible to effectively detect the obstacle. That is, it is possible to avoid a collision and reduce damage by accurately detecting the obstacle.

It should be noted that the collision is avoided on the basis of the distance information in the present embodiment, but the present invention can be applied to a vehicle which travels while following a forerunning vehicle, travels while keeping a center of a vehicle lane, or travels while suppressing a departure from a vehicle lane on the basis of the distance information. Further, the present invention can be also applied to an autonomous operation of the vehicle 59 as well as a driving assistance of the vehicle 59. In addition, the application of the ranging apparatus 60 of the present invention is not limited to a vehicle such as an automobile and also can be, for example, a moving object such as a ship, an airplane, a drone, or an industrial robot. Moreover, the application of the ranging apparatus 60 of the present invention is not limited to the moving object and also can be a wide object recognition device used in an intersection monitoring system and an intelligent transportation system (ITS). For example, the present invention can be also applied to an intersection monitoring camera which is a non-moving object in the intersection monitoring system.

REFERENCE SIGNS LIST 10 camera
11, 53 optical system
12 image pickup device
12a image pickup pixel
12b ranging pixel
12c image pickup/ranging pixel
13 image analysis section
14 distance information acquisition part
30 exit pupil
31, 32, 47, 48 ranging pupil
33 image pickup pupil
34, 35 ranging light flux
36 image pickup light flux
37, 41, 43 micro lens
38, 42, 44 to 46, 49, 50 PD
39, 65 opening
40, 66 light shielding film
51 aperture
52 aperture hole
54 other aperture hole
59 vehicle
60 ranging apparatus

The invention claimed is:

1. A ranging apparatus comprising:
   an image pickup part that includes an optical system including an aperture and an image pickup device including a plurality of pixels arranged therein; and
   a distance information acquisition part configured to acquire object distance information on the basis of output signals of a pair of images including a parallax from each of the plurality of pixels,
   wherein the aperture is provided with:
      first and second aperture holes that define first and second ranging light fluxes; and
      a third aperture hole that defines an image pickup light flux,
   wherein each of the plurality of pixels includes:
      a first photoelectric conversion part for receiving the first ranging light flux to output an image signal of one of the pair of images;
      a second photoelectric conversion part for receiving the second ranging light flux to output an image signal of the other one of the pair of images; and
      a third photoelectric conversion part for receiving the image pickup light flux to output an image signal of an optical image of an object, the third photoelectric conversion part being interposed between the first photoelectric conversion part and the second photoelectric conversion part in the parallax direction.

2. The ranging apparatus according to claim 1, wherein:
   the plurality of pixels include first and second pixels with different incident angle sensitivity characteristics,
   the first pixel includes a first light shielding film with a first opening through which a first light flux having passed through the first aperture hole passes and interrupting a second light flux having passed through the second aperture hole, and
   the second pixel includes a second light shielding film with a second opening through which the second light flux passes and interrupting the first light flux.

3. The ranging apparatus according to claim 2, wherein:
   the first opening is eccentrically disposed in the parallax direction from a center of the first pixel, and
   the second opening is eccentrically disposed in a second direction opposite to the parallax direction from a center of the second pixel.

4. The ranging apparatus according to claim 2, wherein:
   the first pixel includes a first micro lens,
   the second pixel includes a second micro lens,
   the first opening is eccentrically disposed in the parallax direction from an optical axis of the first micro lens, and
   the second opening is eccentrically disposed in a second direction opposite to the parallax direction from an optical axis of the second micro lens.

5. The ranging apparatus according to claim 2, wherein:
   the first aperture hole and the second aperture hole are arranged in the parallax direction,
   a width of an optical image of the first aperture hole on the first light shielding film in the parallax direction is smaller than a width of the first opening in the parallax direction, and
   a width of an optical image of the second aperture hole on the second light shielding film in the parallax direction is smaller than a width of the second opening in the parallax direction.

6. The ranging apparatus according to claim 2, wherein the third aperture hole is interposed between the first aperture hole and the second aperture hole.

7. The ranging apparatus according to claim 6, wherein the plurality of pixels include a third pixel with an incident angle sensitivity characteristic different from those of the first pixel and the second pixel.

8. The ranging apparatus according to claim 7, wherein:
   the third pixel includes a third light shielding film with a third opening through which a third light flux having passed through the third aperture hole passes and interrupting the first light flux and the second light flux,
   the first light shielding film interrupts the second light flux and the third light flux, and
   the second light shielding film interrupts the first light flux and the third light flux.

9. The ranging apparatus according to claim 8, wherein the third opening is disposed on a center of the third pixel.

10. The ranging apparatus according to claim 8, wherein:
    the third pixel includes a third micro lens, and
    the third opening is disposed on an optical axis of the third micro lens.

11. The ranging apparatus according to claim 6, wherein the optical image of the object is formed by a light flux having passed through the third aperture hole.

12. The ranging apparatus according to claim 1, wherein:
    the first aperture hole and the second aperture hole are arranged in the parallax direction,
    a width of an incident angle distribution of a light flux having passed through the first aperture hole in the parallax direction is smaller than a half value width of an incident angle sensitivity characteristic of the pixel in the parallax direction, and
    a width of an incident angle distribution of a light flux having passed through the second aperture hole in the parallax direction is smaller than a half value width of an incident angle sensitivity characteristic of the second pixel in the parallax direction.

13. The ranging apparatus according to claim 1, wherein the distance information acquisition part acquires the object distance information on the basis of a parallax of an optical image formed by a light flux passing through the first aperture hole and an optical image formed by a light flux passing through the second aperture hole.

14. The ranging apparatus according to claim 1, wherein the aperture is formed so that the first light flux having passed through the first aperture hole and the second light flux having passed through the second aperture hole have the same polarization state and the same wavelength.

15. A moving object comprising:
    a ranging apparatus; and
    a control device configured to control the moving object on the basis of a distance measurement result of the ranging apparatus,
    wherein the ranging apparatus includes:
       an image pickup part that includes an optical system including an aperture and an image pickup device including a plurality of pixels arranged therein; and
       a distance information acquisition part that acquires object distance information on the basis of output signals of a pair of images including a parallax from each of the plurality of pixels,
    wherein the aperture is provided with:
       first and second aperture holes that define first and second ranging light fluxes; and
       a third aperture hole that defines an image pickup light flux, wherein each of the plurality of pixels includes:
- a first photoelectric conversion part for receiving the first ranging light flux to output an image signal of one of the pair of images;
- a second photoelectric conversion part for receiving the second ranging light flux to output an image signal of the other one of the pair of images; and
- a third photoelectric conversion part for receiving the image pickup light flux to output an image signal of an optical image of an object, the third photoelectric conversion part being interposed between the first photoelectric conversion part and the second photoelectric conversion part in the parallax direction.

16. The moving object according to claim 15, further comprising:
- a moving object information acquisition device configured to acquire information of the moving object,
- wherein the control device controls at least one of a moving direction or a moving speed of the moving object on the basis of the moving object information and a distance measurement result.

* * * * *